US008757580B2

(12) United States Patent
Volke et al.

(10) Patent No.: US 8,757,580 B2
(45) Date of Patent: Jun. 24, 2014

(54) HEIGHT-ADJUSTABLE PEDESTAL

(75) Inventors: Andreas Volke, Grünwald (DE);
Günther Volke, Feldkirchen (DE)

(73) Assignee: Tever Technik GmbH & Co. KG.,
Bruckmühl (DE)

( * ) Notice: Subject to any disclaimer, the term of this patent is extended or adjusted under 35 U.S.C. 154(b) by 440 days.

(21) Appl. No.: 12/942,559

(22) Filed: Nov. 9, 2010

(65) Prior Publication Data
US 2012/0112035 A1 May 10, 2012

(51) Int. Cl.
*F16M 13/00* (2006.01)
*B65H 75/48* (2006.01)

(52) U.S. Cl.
USPC ........................ 248/572; 248/571; 242/375.3

(58) Field of Classification Search
USPC ......... 248/157, 571, 560, 572, 579, 580, 581, 248/582, 589, 590, 594, 597, 600, 608, 248/364; 242/375.1, 375.3; D6/419, 420, D6/496; 297/338, 339
See application file for complete search history.

(56) References Cited

U.S. PATENT DOCUMENTS

| 550,650 | A | * | 12/1895 | Smelser | 16/198 |
| 1,599,872 | A | * | 9/1926 | Braen | 16/198 |
| 1,977,692 | A | * | 10/1934 | Norling | 242/375.1 |
| 2,010,214 | A | * | 8/1935 | Braun | 16/198 |
| 2,471,998 | A | * | 5/1949 | Berggren | 248/572 |
| 3,123,829 | A | * | 3/1964 | Bronson | 108/136 |
| 3,575,368 | A | * | 4/1971 | Thomas et al. | 248/572 |
| 4,003,552 | A | * | 1/1977 | Sobolewski | 254/283 |
| 4,290,564 | A | * | 9/1981 | Karlsson | 242/375.3 |
| 4,392,546 | A | | 7/1983 | Brown et al. | |
| 4,760,622 | A | * | 8/1988 | Rohrman | 16/196 |
| 4,914,780 | A | * | 4/1990 | Rogers et al. | 16/193 |
| 5,054,162 | A | * | 10/1991 | Rogers | 16/198 |
| 5,277,584 | A | * | 1/1994 | DeGroat et al. | 434/29 |
| 5,865,235 | A | * | 2/1999 | Krupke et al. | 160/191 |
| 6,328,060 | B1 | * | 12/2001 | Smith | 137/355.2 |
| 6,615,897 | B2 | * | 9/2003 | Dorma | 160/191 |

(Continued)

FOREIGN PATENT DOCUMENTS

| DE | 196 15 532 C1 | 6/1997 |
| DE | 298 13 118 U1 | 11/1998 |
| EP | 0 859 200 A2 | 8/1998 |
| EP | 1 375 288 A1 | 1/2004 |

OTHER PUBLICATIONS espacenet, English Abstract for EP0859200 (A2).
espacenet, English Abstract for EP1375288 (A1).
espacenet, English Abstract for DE19615532 (C1).

*Primary Examiner* — Jonathan Liu
*Assistant Examiner* — Chiedu Chibogu
(74) *Attorney, Agent, or Firm* — Cahn & Samuels, LLP

(57) ABSTRACT

The invention relates to a height-adjustable pedestal comprising a height adjustable pedestal platform, a spring device that provides a spring force according to a corresponding spring characteristic, and a lever mechanism that is interconnected between the spring device and the pedestal platform in such a way that the spring force is transferred by the lever mechanism to the pedestal platform in the form of a lifting force that counteracts the weight force of the pedestal platform, in order to facilitate the height-adjustment of the pedestal platform, wherein the lever mechanism is configured such that it at least partially compensates for a variation of the spring force that occurs according to the spring characteristics.

30 Claims, 4 Drawing Sheets

(56) References Cited

U.S. PATENT DOCUMENTS

| | | | |
|---|---|---|---|
| 7,150,424 B2 * | 12/2006 | Hopper | 242/375.1 |
| 7,152,842 B1 * | 12/2006 | Monson et al. | 248/678 |
| 7,478,775 B2 * | 1/2009 | Hopper | 242/375.1 |
| 7,658,359 B2 * | 2/2010 | Jones et al. | 248/406.1 |
| 8,025,090 B2 * | 9/2011 | Kicher | 160/191 |
| 8,444,203 B2 * | 5/2013 | Ohtsubo et al. | 296/75 |

\* cited by examiner

HEIGHT-ADJUSTABLE PEDESTAL

I. BACKGROUND

The invention generally relates to a height-adjustable pedestal, for example for use as a footrest or footrest pedestal, for example as a footrest or a height-adjustable floor for the operator (i.e. driver) of a vehicle, for example of a rail vehicle such as a locomotive, a tram, a metro train, or a multiple unit or trainset.

Rail vehicles are usually provided with height-adjustable seats in order to enable vehicle drivers of different sizes to gain the necessary sight in the direction of travel. Here, the problem arises that usually the vehicle driver has to operate pedals using his feet, wherein, when adjusting solely the height of the seat, the pedals cannot any more be reached in a convenient manner. When, however, additionally providing a height-adjustable footrest, the vehicle driver, for example a train operator, is enabled to always rest his feet on the footrest in a convenient manner regardless of the height of the seat. Here, the footrest may e.g. also be electrically heated.

II. SUMMARY OF THE INVENTION

The invention provides a height-adjustable pedestal, for example a height-adjustable footrest pedestal for use as a footrest or as a height-adjustable floor for the driver of a vehicle, such as a rail vehicle, which pedestal can be produced in a simple and cost-effective manner and nevertheless provides a robust, durable, reliable, and conveniently adjustable mechanism.

The invention in at least one embodiment provides a height-adjustable pedestal comprising: a height-adjustable pedestal platform, a spring device that provides a spring force according to a corresponding spring characteristic, and a lever mechanism that is interconnected between the spring device and the pedestal platform in such a way that the spring force is transferred by the lever mechanism to the pedestal platform in a manner so as to provide a lifting force that counteracts the weight force of the pedestal platform in order to facilitate the height-adjustment of the pedestal platform, wherein the lever mechanism is configured such that it at least partially compensates for a variation of the spring force that occurs according to the spring characteristic.

As the lever mechanism allows for substantially compensating for the variation of the spring force (that occurs according to the spring characteristic) acting on the pedestal platform, the pedestal platform may be held with approximately the same lifting force—which may be substantially adapted to the weight of the pedestal platform—in each of its height positions, thus ensuring that height-adjustment of the pedestal platform is equally easy in each height-position. The lever mechanism may also be adjusted such that the lifting force applied to the pedestal platform is greater than the weight force of the pedestal platform by a (small) substantially constant, i.e. being independent of the height position of the pedestal platform, amount. Or, the lever mechanism may be adjusted such that the lifting force lies within a predetermined range, for example within ±10% of a predetermined target value.

The term "spring device" is to be understood to encompass any kind of mechanical spring, such as a coil spring (tension or compression spring) or a torsion spring, but also a pneumatic spring (gas-pressurized spring). The spring device may itself also comprise a plurality of springs, for example in the form of a spring package. Moreover, also a plurality of spring devices may be provided, each of which acting on a respectively associated lever mechanism, wherein each of the spring devices may in turn comprise one or more springs.

The pedestal may comprise a base, which may for example be provided for fastening the pedestal to a vehicle body or to another base body, or for mounting components of the pedestal thereto. The base may for example be a plate, such as a metal plate or a plate made of a synthetic material such as plastics, or may be a frame or a rack. Furthermore, a base body, such as for example a vehicle body, may form a part of the base or may form the base itself.

For simplicity, in the following the spring device is sometimes simply referred to as the "spring", being understood to refer to a spring device as described above. One end of the spring or spring device may be fixedly attached to a lever arm of the lever mechanism, such that the spring device may be tensioned and relaxed (i.e. tension-released) by the movement of the lever arm. Another end of the spring, for example an end thereof that is remote from the lever mechanism, may be fixedly attached to the base of the pedestal or to the pedestal platform itself (for example via gluing, welding, screwing, clamping), such that the spring force(s) provided by the spring device are received by either the base or the pedestal platform at this end of the spring.

The respective spring or spring device may for example have a linear, progressive, or degressive spring characteristic. However, the spring device may also have a spring characteristic with an arbitrary shape, for example an irregular shape.

The term "lever mechanism" is to be understood to encompass any kind of leverage or lever arrangement having a variable leverage ratio. For example, the lever mechanism may be configured as a rod-shaped lever which is divided—by a rotation shaft functioning as a lever pivot point—into two lever arms, wherein the position of the rotation shaft, which determines the length ratio of the two lever arms, is variable and, thus, the leverage ratio, which is determined by the length ratio of the lever arms, is also variable. In such a case, the positioning of the rotation shaft may for example be realized by means of a pure mechanical coupling between the pedestal platform and the rotation shaft in such a way that a position change of the pedestal platform is converted to a position change of the rotation shaft and, thus, effects a change of the leverage ratio.

The lever mechanism may also comprise an arrangement having one or more lever arms, each of which is pivotably mounted on a respective rotation shaft. For example, such an arrangement may comprise a lever arm and a tension spring, wherein one end of the lever arm is fixedly mounted to a rotation shaft, the weight force of the pedestal platform acts on the free end of the lever arm and thus generates a first torque acting on the rotation shaft, and the spring force of the tension spring e.g. acts on a pulley, that is fixedly mounted on the rotation shaft, in such a way that it generates a second, retaining torque which is directed so as to counteract the first torque. This arrangement may be configured such that, when the lever arm is aligned along an approximately vertical direction, the tension spring is elongated to a lesser extent and hence exerts a smaller retaining force, and that, when the lever arm is aligned along an approximately horizontal direction, the tension spring is elongated to greater extent and hence exerts a greater retaining force holding the lever arm. Because the weight force of the pedestal platform is vertically directed downwards and the effective length of the lever arm is determined by the actual lever arm length and the angle formed between the lever arm and the weight force acting thereon, the lever arm being vertically aligned results in a shorter effective lever arm length, whereas the lever arm being horizontally aligned results in a longer effective lever arm length. Hence, in the above described configuration, along with an increasing strength of the retaining spring force holding the lever arm, the effective lever length increases as well and thus, the spring characteristic of the tension spring may at least partially be compensated for.

The lever mechanism may also comprise an arrangement having one or more cog or friction wheels and lever arms that are fastened to rotation axes of the respective wheels, wherein the wheels may interact so as to transfer the forces acting on the respective lever arms. Here, the force transmission may as well be realized using pulleys that are mounted to the respective axes and cables that are guided over these pulleys.

According to a further embodiment, the lever mechanism comprises a cam disc that defines a—for example continuous or stepless—leverage ratio variation, and a cable (or rope) that is guided over the cam disc, wherein the spring force is transmitted to the pedestal platform via the cable. The term cable is to be understood to encompass any kind of flexible transmission means, the cable may for example be realized as a steel cable or a synthetic cable, as a chain (e.g. a transmission chain), or a drive belt (e.g. a smooth or a toothed drive belt).

The cam disc may be rotatably supported on a rotation shaft, wherein either the cam disc may be non-rotatably, e.g. fixedly, attached to the rotation shaft (so as to co-rotate with the rotation shaft), or the cam disc may be rotatable around the rotation shaft while the rotation shaft remains stationary (i.e. does not rotate).

The cam disc may be interconnected between the spring device and the pedestal platform in such a way that the weight force of the pedestal platform can act on the cam disc or on its rotation shaft so as to generate a first torque (with respect to the rotation shaft) acting on the cam disc, and that the spring force of the spring device can act on the cam disc or on its rotation shaft so as to generate a second torque which acts on the cam disc and counteracts (i.e. is directed opposed to) the first torque. Here, the weight force may be transmitted to the rotation shaft or to the cam disc for example by means of a cable which is coupled between the pedestal platform and a pulley that is fixedly coupled to the cam disc (so as to co-rotate with the cam disc), or by any other suitable mechanism. Accordingly, the spring force may be transmitted to the rotation shaft or to the cam disc for example by means of a cable which is coupled between the spring device and a pulley that is fixedly coupled to the cam disc, or by any other suitable mechanism.

As an example, the first torque, which is caused by the weight of the pedestal platform, may be generated by attaching the cable, which is guided over the cam disc, with/at a first end thereof to the cam disc and with/at a second end thereof to the pedestal platform (either directly or indirectly). The cable, extending from the pedestal platform, may be guided along a curved line or curved path of the cam disc and transfer the weight force of the pedestal platform to the cam disc. The absolute value of the first torque may thus be influenced by the distance of the contact point—where the cable, extending from the platform, meets the cam disc (in the following sometimes referred to as the point of application of the platform weight at the cam disc)—from the rotation shaft of the cam disc, i.e. may be influenced by the shape of the curved line. The curved line of the cam disc may be formed in such a shape that the first torque and the second torque basically compensate each other (i.e. have substantially equal absolute values) in every height position of the pedestal platform. The curved line may be formed in any desired shape, wherein this shape may be adapted to the spring characteristic and thus, the curved line allows for an optimized continuous (or stepless) or stepwise adaptation of the lever mechanism to the spring characteristic of the spring device used.

As another example, the first torque, which is caused by the weight of the pedestal platform, may be generated by mounting the cam disk to the pedestal platform and attaching the cable, which is guided over the cam disc, with/at a first end thereof to the cam disc and with/at a second end thereof to a base of the pedestal.

As a further example, the second torque, which is caused by the spring force of the spring device, may be generated by attaching the cable, which is guided along or over a curved line of the cam disc, with a first end thereof to the cam disc and with a second end thereof to the spring device, such that the cable can transfer the spring force to the cam disc. Here, the absolute value of the second torque may be influenced by the shape of the curved line.

The curved line may be formed in a shape adapted to the spring characteristic in such a way that the first torque and the second torque substantially compensate each other in every height position of the pedestal platform. In any case, due to the curved line, the lifting force can be adjusted independently from the height position of the pedestal platform.

As a further example, the cable, which is guided over the cam disc along the curved line, may be attached with a first end thereof to a cam disc side end of the spring device and with a second end thereof to the pedestal platform. Here, both the first torque, being caused by the weight of the pedestal platform, and the second torque, being caused by the spring force, may be influenced by the shape of the curved line, wherein the curved line may be formed or shaped in such a way that the first and the second torque essentially compensate each other irrespective of the height position of the pedestal platform.

As still another example, a first and a second cam disc—which may e.g. both be non-rotatably, e.g. fixedly, mounted to a common rotation shaft so as to co-rotate with the rotation shaft—may be provided, wherein for example the first torque, being caused by the weight of the pedestal platform, may be transferred to the rotation shaft by means of a first cable which is interconnected between the pedestal platform and the first cam disc, and wherein for example the second torque, being caused by the spring force, may be transferred to the rotation shaft by means of a second cable which is interconnected between the spring device and the second cam disc. In this configuration, the curved line of the first cam disc and the curved line of the second cam disc may be formed such that the first torque and the second torque essentially compensate each other in every height position of the pedestal platform.

The various cables may be conducted or guided via corresponding cable guiding devices such as for example guide pulleys, deflection pulleys, cable guiding rings or channel-shaped or tubular cable guides.

The term cam disc is to be understood to encompass any, for example disk-shaped or block-shaped, rotary body being rotatably supported via a rotation shaft and comprising a curved path or curved line that is formed on the rotary body so as to extend around the rotation shaft. The cable that is guided over the cam disc, and is for example attached to the pedestal platform, may be guided along this curved line. The curved line may for example be realized in the form of a guide, for example a guide groove or a guide channel being formed on the rotary body. The cam disc may for example be realized as a plane parallel disc with a circumferential edge thereof forming the curved line. The cam disc may e.g. be realized as a rotary body being rotationally symmetric with respect to a rotation axis (e.g. the rotation shaft).

According to a further embodiment, the cam disc is realized as a cone-shaped body with a curved line formed thereon, wherein the curved line extends along the cone-shaped body in a helically wound spiral manner (i.e. in a helical shape with a decreasing helical diameter). The curved line thereby may extend concentrically around the central axis of the cone-shaped body. This configuration allows for a smooth, stepless variation of the leverage ratio simply by winding and unwinding the cable being guided over the cam disc and for example being attached to the pedestal platform, wherein the degree or the amount of the variation of the leverage ratio may be adjusted in a simple manner via the opening angle of the cone and/or via the pitch of the helically shaped curved line.

In the present context, the term "cone-shaped body" is to be understood to encompass for example also a stepped cone-shaped body in the form of several cylinders having different diameters and being coaxially placed on top of one another, wherein the curved line may extend along the outer surface of the respective cylinders in the form of a helical line, such that the diameter of the helical line varies in a stepwise manner (i.e. in stages).

According to a further embodiment, the spring device comprises a mechanical spring. The term mechanical spring is to be understood to encompass (without being restricted thereto) for example coil springs in the form of e.g. tension or compression springs, torsion springs, but also flexural or bending springs and rubber springs. Moreover, the term spring device or spring also encompasses spring packages comprising several single springs being interconnected in a serial and/or parallel manner. The spring force and spring characteristic of mechanical springs may exhibit a lower dependency on outer parameters, such as temperature and air pressure, than for example gas-pressurized springs. Moreover, mechanical springs may be basically maintenance-free, may be resistant against various environmental influences (such as salty air, humidity, temperature or dust), and may allow an autonomous operation of the height-adjustable pedestal (e.g. requiring no electrical or hydraulic components for realizing the height-adjustability). Moreover, mechanical springs may exhibit a significantly longer operational life span (i.e. durability) than for example electrical or pneumatic drives.

According to a further embodiment, the spring device comprises a torsion spring (for example, a mechanical spring of the spring device may be a torsion spring). The torsion spring may for example be realized as a torsion bar spring, a coil spring, or a wire or belt (such as a metal band) that is fixed at both axial ends thereof. Torsion springs may exhibit a linear spring characteristic and may thus allow for adapting the lever mechanism to the spring characteristic in a simple manner. Moreover, torsion springs may develop high spring loads or spring forces while at the same time displaying only a small variation of the occupied space, and thus may allow for a space-saving arrangement.

According to an embodiment, a mechanical spring of the spring device is disposed coaxially with the rotation shaft of a cam disc of the lever mechanism. For example, a coil-shaped compression or tension spring may be wound around the rotation shaft, wherein the spring force may e.g. be transferred directly to the cam disc using a cable that is interconnected between the cam disc and an end of the coil spring that is arranged proximally to the cam disc. In the same manner, a coil-shaped torsion spring may be wound around the rotation shaft.

According to an embodiment, the spring device comprises a torsion spring, wherein one end of the torsion spring is non-rotatably, e.g. fixedly, coupled to a cam disc of the lever mechanism so as to co-rotate with the cam disc. For example, an end of the torsion spring, that is proximal to the cam disc of the lever mechanism, may be fixedly connected—e.g. via gluing, screwing together, clamping or welding—to the cam disc, and another end of the torsion spring, that is distal from the cam disc, may be non-rotatably, e.g. fixedly, connected to a base of the pedestal. For example, the end of the torsion spring that is proximal to the cam disc may be fixedly attached to the cam disc so as to co-rotate with the cam disc, or may be formed integrally with the cam disc, or may function as a part of the rotation shaft of the cam disc. The torsion spring may e.g. be realized as a coil spring which may be wound around at least a part of the rotation shaft of the cam disc, wherein that end of the torsion spring, that is proximal to the cam disc, is fixedly connected to the cam disc, for example via fixedly attaching it directly to the cam disc or to the rotation shaft thereof. Here, the cable may be attached with a first end thereof to the pedestal platform, may then extend from the platform to the cam disc and along the curved line of the cam disc, and may finally be fixedly attached with the second end thereof to the cam disc.

According to a further embodiment, the spring device comprises a coil spring, wherein the coil spring may for example be arranged with its longitudinal direction being aligned vertically or horizontally. The coil spring may e.g. be configured as a compression spring, tension spring, or torsion spring. For example, the lever mechanism may comprise a cam disc that is rotatably mounted on a vertically aligned rotation shaft, wherein the coil spring may be arranged coaxially with the rotation shaft as described above, i.e. may for example be wound around the rotation shaft.

According to an embodiment, the spring device and the lever mechanism (or at least a part of the lever mechanism) are arranged to be stationary. For example, a cam disc of the lever mechanism and the spring device may be arranged to be stationary (e.g. may be mounted to a base of the pedestal) so as to not change their height position when the pedestal platform is height-adjusted, wherein e.g. the spring force of the spring device may be transmitted to the pedestal platform by means of a cable of the lever mechanism, that may be interconnected between the cam disc and the pedestal platform. For example, the spring device may comprise a torsion spring that is arranged with its longitudinal axis being aligned horizontally, wherein one longitudinal end of the torsion spring may be non-rotatably attached to a base or a frame of the pedestal and the other longitudinal end of the torsion spring may be non-rotatably connected to a cam disc of the lever mechanism, wherein the cam disc may be rotatably mounted to the base or the frame of the pedestal.

According to a further embodiment, the spring device and the lever mechanism (or at least a part of the lever mechanism) are arranged on the pedestal platform to be vertically movable therewith. For example, a cam disc of the lever mechanism and the spring device may be mounted to the pedestal platform so as to be vertically movable together with the platform, wherein e.g. the spring force of the spring device may be transmitted to the pedestal platform by means of a cable of the lever mechanism, that may be interconnected between the cam disc and a base or a frame of the pedestal.

According to an embodiment, the pedestal comprises two or more (separate) spring devices, each of which comprises one or more springs. The spring devices may exert, via two (or more) respectively assigned lever mechanisms, respective lifting forces to the pedestal platform at two different points, wherein these points may be positioned so as to be symmetric with respect to the pedestal. Using two (or more) spring devices may thus allow for a more uniform distribution of the overall lifting force acting on the pedestal platform. Moreover, using more than one spring device may allow for exerting larger overall lifting forces.

According to an embodiment, the pedestal comprises two (or more) spring devices, wherein each of the two (or more) spring devices comprises a coil spring.

According to an embodiment, the pedestal comprises two (or more) spring devices, wherein each of the two (or more) spring devices comprises a coil spring that is arranged with its longitudinal axis being aligned horizontally, and wherein the two (or more) coil springs are arranged one above the other. For example, each of the spring devices may comprise a helical torsion spring that is aligned with its longitudinal axis being aligned horizontally, wherein e.g. one longitudinal end of the torsion spring may be non-rotatably (e.g. fixedly) connected to a base or a frame of the pedestal and the other longitudinal end of the torsion spring may be non-rotatably (e.g. fixedly) connected to a cam disc of the lever mechanism, wherein the spring force may be transmitted to the pedestal platform by means of a cable of the lever mechanism, that is interconnected between the cam disc and the pedestal platform, and wherein the torsion springs of the spring devices are arranged one above the other. Such a stacked arrangement of the springs may allow for a space-saving configuration of the pedestal.

According to an embodiment, the pedestal comprises a guiding device, wherein the pedestal platform is movable along the guiding device while being guided along the guiding device in a vertical direction defined by the guiding device. For example, the pedestal may comprise a slide carriage being supported on the guiding device such that it can slide along the guiding device while being vertically guided, wherein the pedestal platform is affixed to the slide carriage. As an alternative or in addition to a sliding device, the pedestal may comprise a roller bearing device which is supported on the guiding device such that it can roll along the guiding device while being vertically guided, for example along a guiding groove formed on the guiding device, wherein the pedestal platform is affixed to the roller bearing device. The guiding device may e.g. be fixedly attached to a base of the pedestal, for example to a vehicle body. The guiding device may e.g. be formed by one or more rails or pillars having vertically extending guide rails, for example guide grooves, formed thereon. However, as the guiding device, also a lazy tongs mechanism may be provided.

The pedestal platform may be provided with buttons and/or pedals, for example serving for actuating safety steering switches, horns, door-openers etc.

The pedestal platform may for example be realized as a plate, e.g. a metal or plastic plate, being arranged substantially horizontally or inclined against the horizontal plane, wherein such an inclination may be adjustable. With this configuration, the pedestal platform may be provided with a very flat shape such that, when the platform is lowered completely, the upper surface of the platform is positioned just slightly above the mounting surface on which the pedestal is mounted. In another configuration, the pedestal platform may be formed in a box-like shape. With this configuration, for example electrical and/or hydraulic control lines for the buttons and/or pedals provided on the pedestal and on the pedestal platform may be accommodated within the box.

The pedestal may comprise a manually operable (e.g. being operable by hand or by foot) locking mechanism configured for securing and holding the pedestal platform in an adjusted height position, wherein the locking mechanism may for example be provided on a base or a guiding device of the pedestal and/or on the pedestal platform. For example, the locking mechanism may be realized as a locking or clamping lever which may clamp the pedestal platform in an adjusted height position and thus may fix the pedestal platform so as to be immovable. As another example, the locking mechanism may be realized as a locking pin that is provided on the pedestal platform and that may engage in a respective hole out of a vertical row of holes formed, e.g., on a guide rail.

According to a further embodiment, the invention includes a height-adjustable pedestal platform, a driving device that provides a driving force according to a corresponding force characteristic, and a force transmission device that is interconnected between the driving device and the pedestal platform in such a way that the driving force is transferred by the force transmission device to the pedestal platform in a manner so as to provide a lifting force that counteracts the weight force of the pedestal platform in order to facilitate the height-adjustment of the pedestal platform, wherein the force transmission device is configured such that it at least partially compensates for a variation of the driving force that occurs according to the force characteristic. According to a further embodiment, the driving device may include a mechanical driving device, a spring device, a pneumatic driving device, an electrical driving device, or a hydraulic driving device. According to a further embodiment, the force transmission device may include a mechanical force transmission device e.g. lever mechanism, a pneumatic force transmission device, an electrical force transmission device, or a hydraulic force transmission device.

III. BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

IV. DETAILED DESCRIPTION

Figure 1:
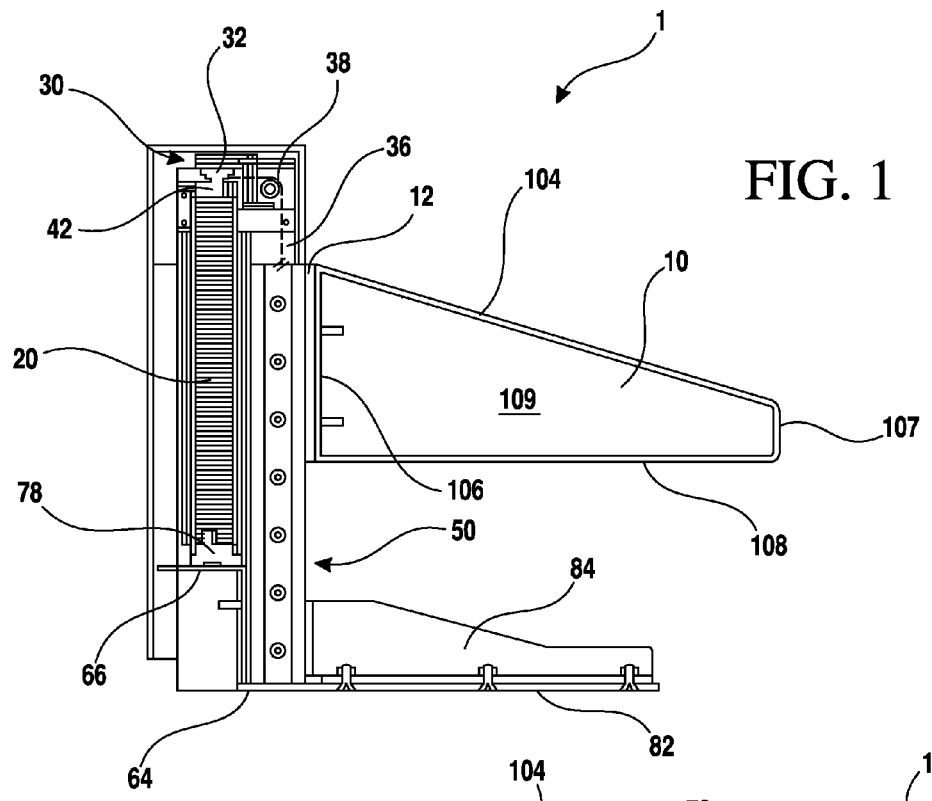
FIG. 1 illustrates a sectional side view of a height-adjustable pedestal according to an embodiment of the invention.
Figure 2:
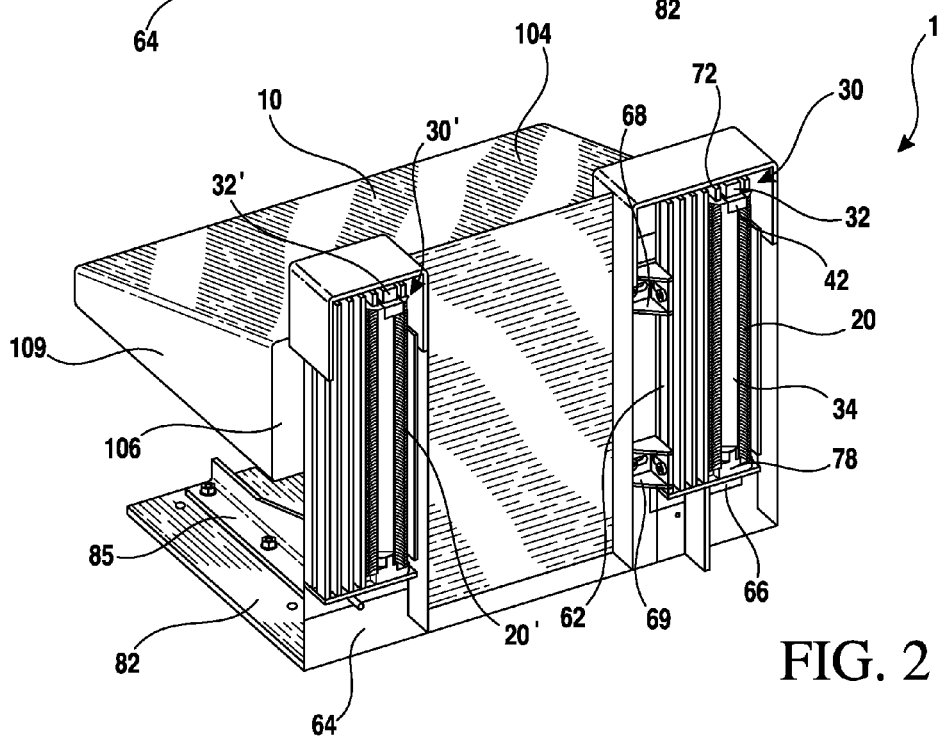
FIG. 2 illustrates a sectional perspective view of the pedestal according to FIG. 1.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and mechanical changes may be made without departing from the scope of the invention. The various embodiments are not necessarily mutually exclusive, as some embodiments can be combined with one or more other embodiments to form new embodiments.

According to FIGS. 1 to 4, a height-adjustable pedestal 1 according to an embodiment of the invention comprises a height-adjustable, box-shaped pedestal platform 10, two spring devices 20, 20' and two corresponding lever mechanisms 30, 30'. The pedestal platform 10 is supported on a guiding device 50 of the pedestal 1 so as to be movable in a guided manner in a vertical direction defined by the guiding device 50. The first lever mechanism 30 is interconnected between the first spring device 20 and the pedestal platform 10, thus forming a first force line or force path, and the second lever mechanism 30' is interconnected between the second spring device 20' and the pedestal platform 10, thus forming a second force path. These two force paths are designed in an identical way and, hence, in the following only the first force path, extending from the first spring device 20 via the first lever mechanism 30 to the pedestal platform 10, will be described.

Figure 3:
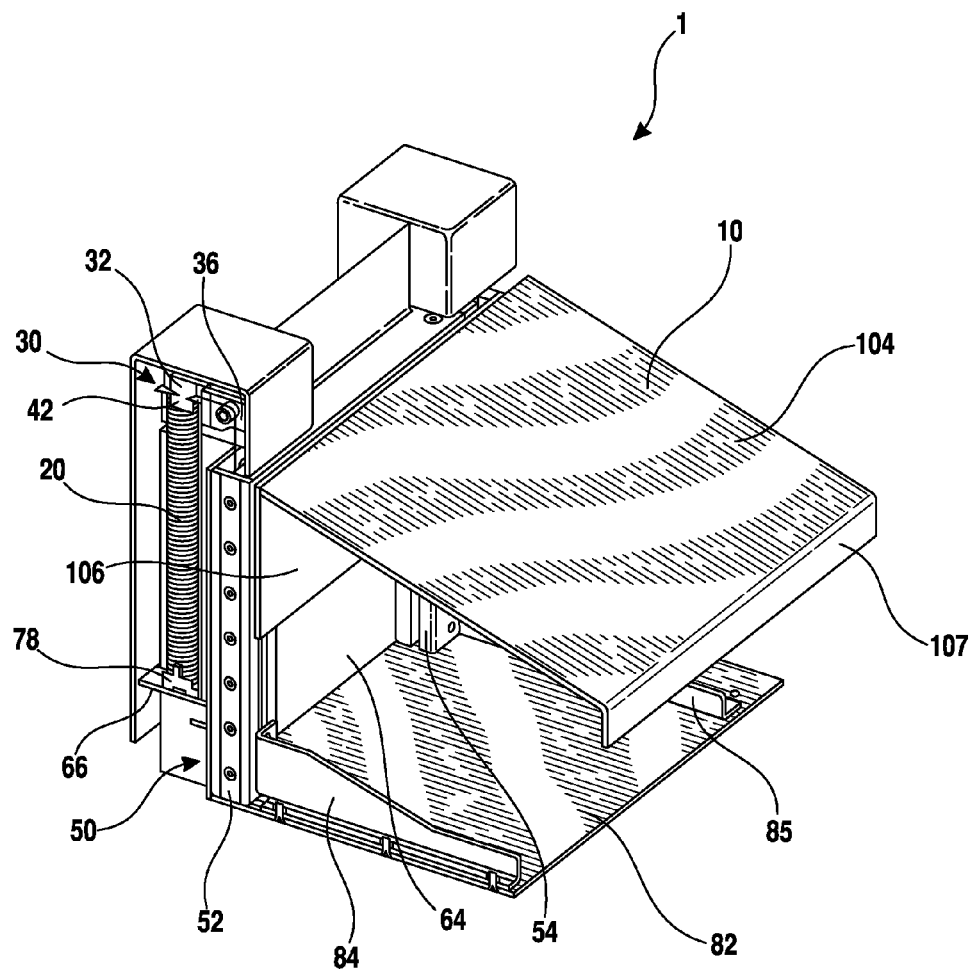
FIG. 3 illustrates a sectional perspective view of the pedestal according to FIG. 1 as seen obliquely from the front.
Figure 4:
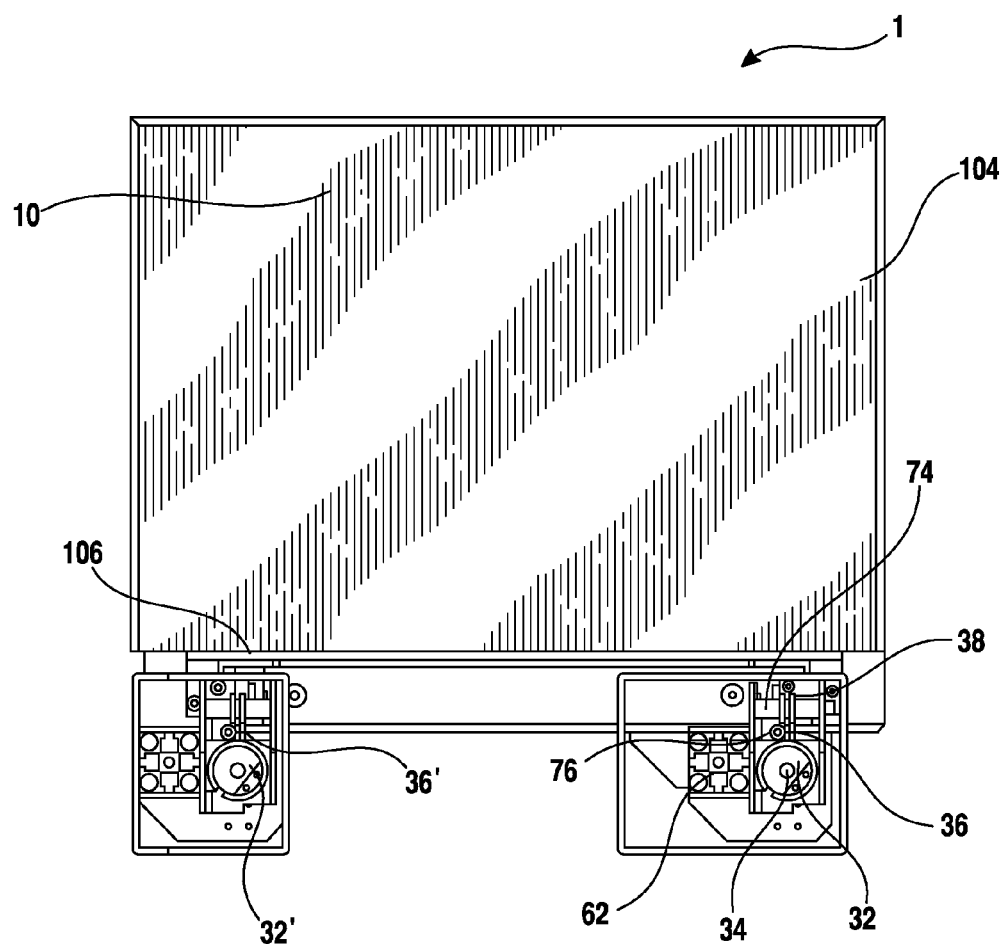
FIG. 4 illustrates a top view of the pedestal according to FIG. 1.

As is illustrated in the figures (see, e.g., FIG. 1), the pedestal platform 10 may have a variety of shapes and constructions, but each of the illustrated variants includes a platform plate 104 and a rear wall 106, which attaches to a carriage slide 12 although in at least one embodiment the rear wall 106 and carriage slide 12 are integrally formed. The platform plate 104 extends away from the rear wall 106 either at an incline with the horizontal plane as illustrated in FIGS. 1-4 or substantially horizontal. In an alternative embodiment, the incline of the plate 104 is adjustable. FIG. 3 illustrates the platform 10 as also including a front wall 107, while FIG. 1 illustrates the inclusion of a bottom wall 108. FIG. 1 illustrates the platform 10 as including optional side walls 109. In at least one embodiment, the platform 10 is hollow when a box-shape is defined as illustrated in FIG. 3. When the platform 10 includes an open area, this area can be used, for example, for electrical and/or hydraulic control lines for the buttons and/or pedals provided on the pedestal and on the pedestal platform.

The lever mechanism 30 comprises a cam disc, here in the form of a volute 32, that is formed as a rotationally symmetric body in the shape of a cone or truncated cone, wherein a curved line in the form of a helically wound spiral-shaped guide groove extends along the outer surface of the cone-shaped body, wherein the cone-shaped body of the volute 32 is arranged with its symmetry axis (which also represents its rotation axis) being aligned in a vertical direction. In the given configuration, the diameter of the volute 32 decreases from the top to the bottom and, thus, the diameter of the helical line of the guide groove also decreases from the top to the bottom (however, the volute may as well be provided with its diameter decreasing from the bottom to the top of the cone-shaped body). In addition, in the present embodiment, three windings with a constant diameter are provided at the upper end of the volute 32. The volute 32 is arranged to be rotatable around its vertically aligned symmetry axis. In this case, the volute 32 is fixedly mounted to an axial end of a rotation shaft 34, wherein the rotation shaft 34 extends in a vertical direction so as to be arranged coaxially with the volute 32 and is rotatable as well. In the given embodiment, the volute 32 is formed integrally with the rotation shaft 34.

The lever mechanism 30 further comprises a cable 36, wherein the first end of the cable 36 is fixedly attached to the upper end of the volute 32, for example by being firmly clamped using a clamping device that is fixedly attached to the volute 32. The cable 36 extends from the upper end of the volute 32 and is guided, following the helically wound spiral-shaped guide groove of the volute 32, towards the lower end of the volute 32, thus being wound around the volute 32.

From the volute 32, the cable 36 extends horizontally towards a guide pulley 38, is guided over the guide pulley 38 and then extends vertically downwards towards the pedestal platform 10. With its second end, the cable 36 is fixedly attached to the pedestal platform 10 or to a component that is fixedly connected to the pedestal platform 10 (for example, the second end of the cable 36 may be firmly clamped using a clamping device that is fixedly attached to the pedestal platform 10), such that, via the cable 36, the weight force of the pedestal platform 10 acts on the volute 32 and thus induces a first torque M1 acting on the volute 32, the first torque M1 being directed so as to act in a direction for unwinding the cable 36 from the volute 32.

The spring device 20 is realized in the form of a mechanical, helical torsion spring 20, wherein the torsion spring 20 is wound around the rotation shaft 34 of the volute 32 so as to be arranged coaxially with the rotation shaft 34. The upper end of the helical torsion spring 20 is non-rotatably connected to the volute 32 so as to co-rotate with the volute 32 (in case the volute 32 rotates). In the present configuration, the upper end of the torsion spring 20 is connected to the volute 32 by means of a first abutment piece 42, wherein the first abutment piece 42 is formed integrally with the volute 32 and forms an abutment stop, for example being realized as an abutment shoulder, and wherein the upper end of the torsion spring 20 is supported on the abutment stop in such a way that the upper end of the torsion spring may co-rotate with the volute 32 and, hence, the torsion spring 20 may be tensioned. From the volute 32 (or, respectively, from the first abutment piece 42), the torsion spring 20 vertically extends downwards, and the lower end of the torsion spring 20 is non-rotatably connected to a base of the pedestal 1 or to a component that is non-rotatably connected to the base.

Lowering the pedestal platform 10, i.e. moving the pedestal platform 10 from a higher position to a lower position, results in unwinding the cable 36 from the volute 32 and, thus, causes a rotation of the volute 32 in a corresponding direction. This rotation is transferred to the upper end of the torsion spring 20 and causes a corresponding twisting (i.e. torsion) of the torsion spring 20 and an increase in the corresponding restoring (i.e. counteracting the torsion) spring force according to the spring characteristic of the torsion spring 20.

The upper end of the torsion spring 20 is non-rotatably connected to the volute 32 (or to the rotation shaft 34 thereof) so as to co-rotate with the volute 32 and, hence, the restoring force of the torsion spring 20 is transferred to the volute 32 in the form of a second torque M2 acting on the volute 32. The second torque M2 is opposed to the first torque M1 caused by the weight of the pedestal platform 10 and, hence, acts in a direction for winding the cable 36 around the volute 32, i.e. for lifting the pedestal platform 10 being attached to the second end of the cable 36. Thus, the second torque M2 causes a lifting force that acts—via the cable 36—on the pedestal platform 10, i.e. the spring force of the spring device 20 (in the form of the helical torsion spring 20) is applied by the lever mechanism 30 (in the form of the volute 32 and the cable 36 being guided over the volute 32) to the pedestal platform 10 in a manner so as to provide a lifting force that counteracts the weight force of the pedestal platform 10.

Thus, for adjusting the height of the pedestal platform 10, it is not required to apply the entire weight force of the pedestal platform 10, but rather, it suffices to apply a residual force which is given by the weight force being reduced by the lifting force. For example, the lifting force may be adjusted such that, when no external force is applied, the pedestal automatically travels upwards and, thus, the residual force always has to be applied pointing in a downward direction. The lifting force is influenced by the second torque M2 acting on the volute 32, and the residual force is determined by the total torque M acting on the volute 32, wherein the total torque M is given by the vector sum of the first torque M1 and the second torque M2.

Thus, if the total torque M acting on the volute 32 remains substantially constant for all height positions (i.e. does not change with the height) of the pedestal platform 10, the residual force required for height-adjusting the pedestal platform 10 will as well be substantially the same for all heights of the pedestal platform 10 and, hence, the height-adjustment of the pedestal platform 10 is facilitated.

The spring force provided by the spring device 20 varies, according to the spring characteristic, with the displacement of the spring or spring device 20 from its rest position. When lowering the pedestal platform 10, the cable 36 is being unwound from the volute 32, and the corresponding rotation of the volute 32 is transferred to the torsion spring 20, wherein the degree of torsion of the torsion spring 20, i.e. the torsion angle, increases as the height of the platform 10 decreases. The restoring force provided by the torsion spring 20 in the form of the second torque M2 varies, according to the spring characteristic, with the degree of torsion, wherein the absolute value of the second torque M2 increases as the torsion of the torsion spring 20 increases, i.e. the amount of the second torque M2 increases as the height of the pedestal platform 10 decreases.

The lever mechanism 30 is configured such that it at least partially compensates a variation of the spring force (in the form of the second torque M2), occurring according to the spring characteristic of the torsion spring 20, by a corresponding variation of the first torque M1 in such a way that the total torque M—and thus also the residual force required for height-adjusting the pedestal platform 10—is substantially the same for all height positions of the pedestal platform 10 (i.e. does not change when the height of the platform is changed), wherein the total torque M may for example be substantially zero.

Here, the variation of the first torque M1 is realized by a variation of the length of the weight-receiving lever arm (here given by the radial distance between the curved line and the rotation axis of the volute 32), i.e. a length variation of the lever arm via which the weight of the pedestal platform 10 acts—via the cable 36—on the volute 32. The amount (i.e. absolute value) of the first torque M1 is determined by the weight of the pedestal platform 10 and the length of the weight-receiving lever arm (i.e. the distance of the position, where the cable 36 carrying the platform weight meets the volute 32, from the rotation shaft 34), wherein the amount of the first torque M1 increases as the length of the weight-receiving lever arm increases.

The diameter of the volute 32 decreases from the top to the bottom. When the pedestal platform 10 is in its highest position and, hence, the torsion of the torsion spring 20 as well as the second torque M2 are minimal, the cable 36 is wound around the volute 32 all the way down to the lower end of the volute 32 and thus, the length of the weight-receiving lever arm and, hence, also the amount of the first torque M1 are minimal as well. The torsion spring 20 is pre-tensioned to such an extent that, in this height position, the second torque M2, resulting from the pre-tensioning, and the first torque M1, corresponding to the minimum length of the weight-receiving lever arm, substantially compensate each other.

When lowering the pedestal platform 10, the cable 36 is being unwound from the volute 32 in a direction from the lower end of the volute 32 towards the upper end thereof while following the curved line and thus, the length of the weight-receiving lever arm and, hence, correspondingly the amount of the first torque M1, increase as the height of the pedestal platform 10 decreases. Thus, when lowering the platform 10, both the first torque M1 and the second torque M2 (which counteracts the first torque M1) increase, wherein the increase of the first torque M1 at least partially compensates the increase of the second torque M2.

As described above, the length of the weight-receiving lever arm varies according to the shape of the cam disc and/or the shape of the curved line, whereas, in the present embodiment, the lever arm transferring the spring force to the volute 32 remains unchanged (i.e. has a constant length). Thus, the leverage ratio of these two lever arms varies with the height position of the pedestal platform 10, i.e. the cam disc in the form of the volute 32 defines a leverage ratio variation.

The length variation of the weight-receiving lever arm may be determined in a simple manner via the opening angle of the cone-shaped body of the volute 32 and/or the pitch (i.e. inclination) of the curved line of the volute 32. In the present case, the length variation of the weight-receiving lever arm is adjusted such that the total torque M acting on the volute 32 and, hence, also the residual force required for height-adjusting the pedestal platform 10, are basically independent of the height position of the platform 10. Thus, the lever mechanism 30 substantially compensates for a variation of the spring force occurring according to the spring characteristic of the spring device 20.

In the embodiment of the invention according to FIGS. 1 to 4, the volute 32 is rotatably arranged on the pedestal 1 using a support rail 62, wherein the support rail 62 is fastened to the back side of a vertical retaining plate 64 of the pedestal 1. The lower end of the support rail 62 is supported on an angle element (or base element) 66, which is fixedly attached to (e.g. screwed together with) the back side of the retaining plate 64. From the angle element 66, the support rail 62 extends vertically upwards and is fixedly attached to the back side of the retaining plate 64, for example using screws. In addition, for further stabilization, short holding angles 68, 69 may be provided, which fixedly couple the support rail 62 to the retaining plate 64, e.g. using screws. With its upper end, the support rail 62 protrudes beyond the upper end of the guiding device 50 of the pedestal 1. At the upper end of the support rail 62, a support arm 72 is provided so as to extend in a lateral direction (cf. FIG. 2), wherein the upper end of the vertically aligned rotation shaft 34 of the volute 32 is rotatably supported on the support arm 72.

The volute 32, being formed integrally with the rotation shaft 34 and the first abutment piece 42, is arranged so as to be rotatable together with the rotation shaft 34. The torsion spring 20 extends from the lower end of the volute 32 (more precise: from the lower end of the first abutment piece 42) vertically downwards, and the lower end of the torsion spring 20 is non-rotatably coupled to a base of the pedestal 1, for example in the vicinity of the retaining plate 64 or directly to the retaining plate 64. In the illustrated configuration, the lower end of the torsion spring 20 is non-rotatably coupled to the angle element 66 (which in turn is fastened to the retaining plate 64) by means of a second abutment piece 78. The second abutment piece is fixedly attached to the angle element 66 and forms an abutment stop, for example being realized as an abutment shoulder, wherein the lower end of the torsion spring 20 is supported on the abutment stop in such a way that the lower end of the torsion spring 20 is non-rotatably coupled to the second abutment piece 78 and, hence, to the angle element 66. However, any other rotation prevention means, e.g. a fixed connection such as a weld connection or a clamping connection, may be used for non-rotatably connecting the spring to the base and/or to the cam disc.

In the present configuration, the rotation shaft 34 of the volute 32 (and the symmetry axis of the volute 32) and the torsion spring 20 are arranged with their longitudinal directions being aligned vertically. However, the rotation shaft of the volute (and the symmetry axis of the volute) and the torsion spring may e.g. also be provided on the pedestal with their longitudinal directions being aligned horizontally, wherein the torsion springs may e.g. be arranged one above the other on the back side of the retaining plate 64.

In order to stabilize the helical torsion spring 20, for example in order to protect the torsion spring 20 from undergoing a deformation, the rotational shaft 34 of the volute 32 extends axially through the torsion spring 20 so as to pass from one axial end of the torsion spring 20 to the other axial end thereof.

The cable 36 is wound around the volute 32, extends from the volute 32 horizontally towards the guide pulley 38, runs over the guide pulley 38 while being guided in a guiding groove that is formed along the circumferential surface of the guide pulley 38, and extends from the guide pulley 38 vertically downwards towards the pedestal platform 10. The guide pulley 38 is arranged to be rotatable around a horizontal axle 74, which in turn is mounted on the support arm 78, wherein the guide pulley 38 is positioned such that it guides the cable 36 directly towards the rotation shaft 34 of the volute 32. On its way from the guide pulley 38 to the volute 32, the cable 38 is horizontally guided along a guide member 76 so as to prevent the cable 38 from escaping from the guiding groove of the guide pulley 38. In the present configuration, the guide member 76 is realized as a guiding shaft that is (for example rotatably) mounted to the support arm 72 and extends in a vertical direction.

According to the embodiment of the invention illustrated in FIGS. 1 to 4, the second force path, extending from the second spring device 20' via the second lever mechanism 30' to the pedestal platform 10, is designed to be identical to the above described first force path. In this case, the second spring device 20' is realized as a second torsion spring 20', and the second lever mechanism 30' is realized in the form of a second volute 32' and a second cable 36' that is guided over the second volute 32'. A first end of the second cable 36' is fixedly attached to the second volute 32', whereas the second end of the second cable 36' is fixedly attached to the pedestal platform 10. The spring force provided by the second torsion spring 20' is applied—by the second lever mechanism 30'—to the pedestal platform 10, acting as a lifting force that counteracts the weight force of the pedestal platform 10.

The second spring device 20' and the second lever mechanism 30' are fastened to the back side of the retaining plate 64 in the same way as the first spring device 20 and the first lever mechanism 30, however at the opposite side of the back side of the retaining plate 64. Thus, the height-adjustment of the pedestal platform 10, being arranged so as to be movable along the guiding device 50 in a vertical direction, is supported and facilitated by both force paths.

In the present embodiment, the guiding device 50 of the pedestal 1 comprises two guide rails 52, 54 which extend vertically in an upward direction and are arranged, with a horizontal distance there between, so as to run parallel to one another. The guide rails 52, 54 are attached (here via screws), at respective rearward lateral surfaces thereof, to the front side of the retaining plate 64. With their lower ends, the guide rails 52, 54 are supported on a base in the form of a base plate 82. At the lower end of each of the guide rails 52, 54, a respective long holding angle wall 84, 85 is provided, which is fixedly coupled (for example via screws) to the respective guide rail 52, 54. The holding angle walls 84, 85 extend along almost the entire base plate 82 and are fixedly coupled to, e.g. screwed together with, the base plate 82. The base plate 82 may be integrally formed, in the form of an angle element, with the retaining plate 64.

A slide carriage 12 is supported on the guiding device 50 in such a way that it can slide along the two guide rails 52, 54 and is guided along a vertical direction defined by the guide rails 52, 54. The pedestal platform 10 is fixedly attached to the slide carriage 12 and extends away from the slide carriage 12 in a substantially horizontal direction.

Each of the guide rails 52, 54 of the guiding device 50 comprises a respective guiding channel being formed on a respective outwardly facing side surface thereof so as to extend vertically along the respective guide rail, each of the guiding channels being open towards the respective outward lateral side.

The slide carriage 12 is provided with a first sliding block, arranged so as to engage the lateral guiding channel of the first guide rail 52 and to be vertically slidable along the same substantially free of play, a second sliding block arranged so as to engage the lateral guiding channel of the second guide rail 54 and to be vertically slidable along the same substantially free of play, and a connecting plate that fixedly couples (e.g. via screws) the two sliding blocks to one another. The two sliding blocks engage—from the respective outer lateral sides—the respectively corresponding guiding channel in a symmetrical manner and are kept together (being at the same height) in this positioning by the connection plate, thus being secured against (laterally) escaping from the respective guide rail 52, 54.

The cables 36, 36'—extending from the volute 32, 32' of the respective lever mechanism 30, 30' to the pedestal platform 10—are fixedly coupled with their respective second ends to the pedestal platform 10. For example, the respective second ends of the cables 36, 36' may be fixedly attached in the vicinity of the sliding blocks or directly to the sliding blocks. In the present configuration, each of the cables 36, 36' is fixedly attached with a second end thereof to a respective one of the sliding blocks. From the pedestal platform 10, each of the cables 36, 36' extends, running in parallel to the guiding channel of the corresponding guide rail 52, 54 (here: running through the corresponding guiding channel), vertically upwards to the respectively corresponding volute 32, 32'.

Figure 5:
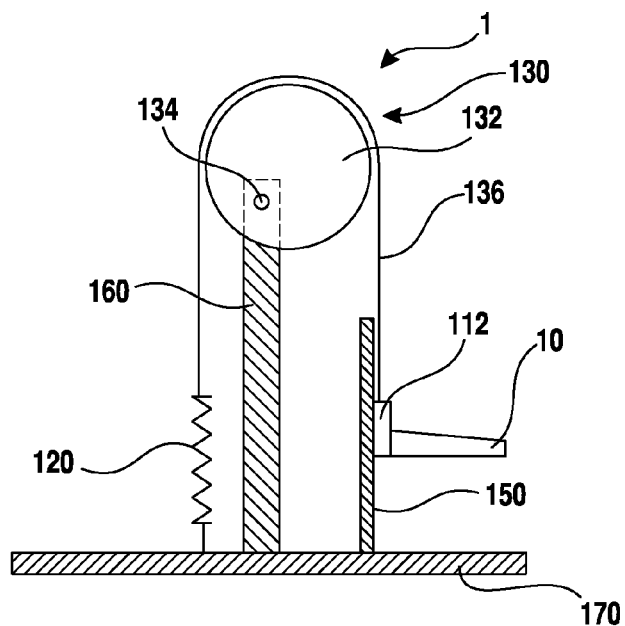
FIG. 5 is a schematic view of a height-adjustable pedestal according to another embodiment.

FIG. 5 schematically illustrates a height-adjustable pedestal 1 according to another embodiment of the invention. With respect to this embodiment, for the same or equivalent parts, the same reference numbers as for the first embodiment have been used.

The pedestal 1 according to this embodiment comprises a height-adjustable pedestal platform 10, a spring device 120, and a lever mechanism 130 that is interconnected between the pedestal platform 10 and the spring device 120. The pedestal platform 10 is supported, for example using a slide carriage 112, on a guiding device 150 of the pedestal 1 so as to be guided and movable in a vertical direction thereof.

The lever mechanism 130 comprises a cam disc, here being realized as a plane-parallel disc 132 having an approximately elliptically shaped outer edge, wherein the curved line of the cam disc follows the circumferential edge of the disc 132. The disc 132 is mounted on a rotation shaft 134 so as to be rotatable around the same, wherein the rotation shaft 134 is aligned to be parallel to the surface normal of the disc 132 and is for example mounted on a mounting support 160 of the pedestal 1. The lever mechanism 130 further comprises a cable 136 that is guided—along the curved line—over the disc 132.

In this embodiment, the spring device 120 is realized as a helical tension spring 120. The lower end of the tension spring 120 is fixedly attached to a base—here to a base plate 170—of the pedestal 1, or to a component that is fixedly attached to the base. The tension spring 120 extends vertically upwards from the base or base plate 170, and the upper end of the tension spring 120 is fixedly connected to a first end of the cable 136.

From the upper end of the tension spring 120, the cable 136 extends vertically upwards, is guided along the curved line of the disc 132 over the disc 132, and extends from the disc 132 vertically downwards towards the pedestal platform 10. The second end of the cable 136 is fixedly attached to the pedestal platform 10 or to a component that is fixedly coupled to the pedestal platform 10, such that, via the cable 136, the weight force of the pedestal platform 10 acts on the disc 132 and induces a first torque T1 (with respect to the rotation shaft 134) acting on the disc 132.

In the embodiment illustrated in FIG. 5, the cam disc is realized as a plane-parallel disc 132, and the cable 136 traverses the disc 132 only once. However, the cam disc may also be realized as a block-shaped rotary body having a curved line that extends—for example in a helically wound shape—along the rotary body. For example, the cam disc may also be realized as a cone-shaped body having a curved line that is helically and spirally wound along the cone-shaped body. In such a case, the cable 136 may be wound or guided—following the curved line—around the rotary body (i.e. the cam disc) several times.

Lowering the pedestal platform 10 effects a corresponding rotation of the disc 132 and a corresponding upward movement of the upper end of the tension spring 120, i.e. causes an elongation of the tension spring 120 and an associated restoring spring force according to the spring characteristic of the tension spring 120, wherein the restoring spring force is directed so as to counteract the spring elongation and increases along with an increasing elongation of the tension spring 120, i.e. with a decreasing height of the pedestal platform 10. Via the cable 136, the spring force of the tension spring 120 acts on the disc 132 and causes a second torque T2 that acts on the disc 132. The second torque T2 is directed so as to counteract the first torque T1 that is caused by the weight of the pedestal platform 10, and hence, the second torque T2 acts in a direction for lifting (i.e. moving upwards) the pedestal platform 10. Hence, the spring force of the spring device 120, being implemented as the tension spring 120, is transferred by the lever mechanism 130, being implemented as the plane-parallel disc 132 with the cable 136 being guided thereover, to the pedestal platform 10 in the form of a lifting force that is directed so as to counteract the weight force of the pedestal platform 10.

The first torque T1, being caused by the weight of the pedestal platform 10, is determined by the weight force of the platform 10, the length of the weight-receiving lever arm (i.e. the lever arm via which the weight of the pedestal platform 10 acts on the disc 132), and the angle between the weight force and the weight-receiving lever arm. The length of the weight-receiving lever arm is given by the distance between the rotation shaft 134 and the point of application of the platform weight at the disc 132.

The second torque, being caused by the spring force of the tension spring 120, is determined by the spring force (that varies according to the corresponding spring characteristic), the length of the spring-force-receiving lever arm (i.e. the lever arm via which the spring force acts on the disc 132), and the angle between the spring force and the spring-force-receiving lever arm. The length of the spring-force-receiving lever arm is given by the distance between the rotation shaft 134 and the point of application of the spring force at the disc 132.

Thus, both the first torque T1 and the second torque T2 are influenced by the shape of the curved line of the cam disc, i.e. in the present case by the shape of the edge of the plane-parallel disc 132. The length ratio of the weight-receiving lever arm and the spring-force-receiving lever arm varies—according to the shape of the curved line—with the height position of the pedestal platform 10. Hence, the cam disc, here being realized in the form of the plane-parallel disc 132, defines a leverage ratio variation.

In the present configuration, the disc 132 and the curved line of the disc 132 are formed such that the first torque T1, being caused by the weight of the pedestal platform 10, and the second torque T2, being caused by the spring force, substantially compensate one another in every height position of the pedestal platform, such that the force which has to be applied for height-adjusting the pedestal platform 10 is substantially independent of the height position of the pedestal platform 10. Hence, the lever mechanism 130 serves for substantially compensating a variation of the spring force occurring according to the spring characteristic of the tension spring 120.

In the embodiment illustrated in FIG. 5, a leverage ratio variation may as well be achieved by providing the rotation shaft 134 at an eccentric position, in which case the cam disc 132 may also have a circular shape.

Figure 6:
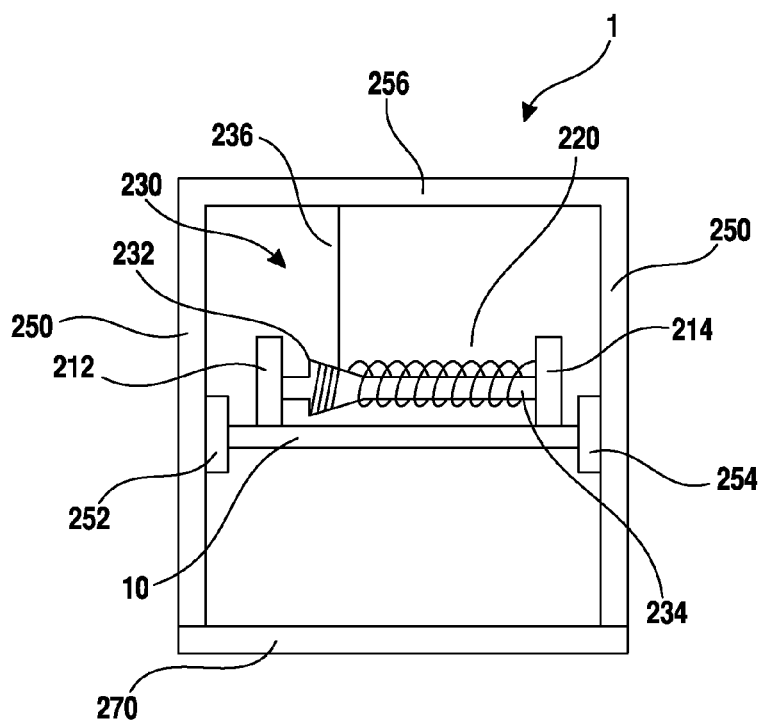
FIG. 6 is a schematic view of a height-adjustable pedestal according to yet another embodiment.

FIG. 6 schematically illustrates a height-adjustable pedestal 1 according to yet another embodiment of the invention. With respect to this embodiment, for the same or equivalent parts, the same reference numbers as for the above described embodiments have been used.

The pedestal 1 according to this embodiment comprises a height-adjustable pedestal platform 10, a spring device 220, and a lever mechanism 230 that is functionally interconnected between the pedestal platform 10 and the spring device 220. The pedestal platform 10 is supported, for example via sliding blocks 252, 254, on a guiding device 250 of the pedestal 1 so as to be guided and movable in a vertical up-down direction thereon.

The lever mechanism 230 comprises a cam disc in the form of a volute 232 that is formed as a rotationally symmetric body in the shape of a (truncated) cone. A curved line in the form of a helically wound, spiral-shaped guide groove extends along the outer surface of the cone-shaped body which is arranged with its symmetry axis (which also represents its rotation axis) being aligned in a horizontal direction. In the configuration illustrated in FIG. 6, the diameter of the volute 232 decreases from the left to the right and, hence, the diameter of the helically curved line also decreases in this direction. The volute 232 is arranged to be rotatable around its horizontally aligned symmetry axis. In the present case, the volute 232 is fixedly mounted to an axial end of a rotation shaft 234, which extends in a horizontal direction so as to be coaxially with the volute 232. In the embodiment according to FIG. 6, the volute 232 is formed integrally with the rotation shaft 234. The rotation shaft 234, together with the volute 232, is rotatably mounted on corresponding support bearings 212, 214, which in turn are fixedly coupled to the pedestal platform 10.

The lever mechanism 230 further comprises a cable 236, wherein a first end of the cable 236 is fixedly attached to the left end of the volute 232 (i.e. the end of the volute 232 where the diameter of the same is largest), and extends—being wound around the volute 232 along the helical curved line— towards the right end of the volute 232 (i.e. the end of the volute 232 where its diameter is smallest).

From the volute 232, the cable 236 extends vertically upwards, and the second end of the cable 236 is fixedly attached to a base of the pedestal 1 or to a component that is fixedly attached to the base. In the configuration according to FIG. 6, the second end of the cable 236 is directly attached to a horizontal bridge portion 256 of the guiding device 250, which guiding device 250 is affixed to a base, here a base plate 270, of the pedestal 1. However, the cable 236 may as well be guided via various pulleys, which are e.g. attached to the pedestal platform 10 and/or to the guiding device 250, before being fixedly coupled to the base.

The spring device 220 is realized in the form of a helical torsion spring 220. A first longitudinal end (in FIG. 6: the left end) of the torsion spring 220 is non-rotatably, in the configuration shown in FIG. 6 fixedly, attached to the volute 232 (or to the rotational axis 234) so as to co-rotate with the volute 232. The torsion spring 232 extends, being wound around the rotational shaft 234 of the volute 232, along the rotational shaft 234, and the second longitudinal end (in FIG. 6: the right end) of the torsion spring 232 is non-rotatably, e.g. fixedly (i.e. immovably), attached to the platform 10 or to a component that is fixedly coupled to the pedestal platform 10. In the configuration shown in FIG. 6, the second end of the torsion spring 220 is fixedly attached to the support bearing 214.

In contrast to the embodiments of FIGS. 1 to 4 and FIG. 5, where the respective cam discs (volutes 32, 132) and spring devices (springs 20, 120) are mounted to a stationary component of the pedestal and are stationary (i.e. do not move translationally), in the present embodiment the cam disc (volute 232) and the spring device (torsion spring 232) are mounted to the pedestal platform 10 so as to be movable up and down together with the platform 10.

The operational principle of the embodiment according to FIG. 6 is similar to the embodiment according to FIGS. 1 to 4 and thus, in the following, only a shortened description of this operational principle will be given.

Via the cable 236, the weight of the pedestal platform 10 acts on the volute 232 and thus induces a first torque D1 acting on the volute 232, the first torque D1 being directed so as to work towards unwinding the cable 236 from the volute 232.

On the other hand, lowering the pedestal platform 10 and thus unwinding the cable 236 from the volute 232 results in a corresponding rotation of the volute 232. This rotation is transferred to the left end of the torsion spring 220 and causes a corresponding torsion of the torsion spring 220 and, hence, an increase in the corresponding restoring spring force according to the spring characteristic of the torsion spring 220. Since the left end of the torsion spring 220 is fixedly connected to the volute 232, the restoring force of the torsion spring 220 acts on the volute 232 and, hence, causes a second torque D2 acting on the volute 232. The second torque D2 is directed so as to be opposed to the first torque D1 caused by the weight of the pedestal platform 10 and, hence, acts in a direction for winding the cable 236 around the volute 232, i.e. towards lifting the pedestal platform 10. Thus, the second torque D2 causes a lifting force that acts—via the cable 236—on the pedestal platform 10, i.e. the spring force of the spring device 220 (in the form of the helical torsion spring 220) is applied by the lever mechanism 230 (in the form of the volute 232 and the cable 236 being guided over the volute 232) to the pedestal platform 10 in a manner so as to provide a lifting force that counteracts the weight force of the pedestal platform 10.

When the pedestal platform 10 is in its highest position, the cable 236 is wound around the volute 232 from the left end up to the right end of the volute 232, where the diameter of the volute 232 is smallest, i.e. the length of the weight-receiving lever arm (via which the weight of the pedestal platform 10 acts on the volute 232) is minimal and, hence, also the absolute value of the first torque D1 is minimal. The torsion spring 220 is pre-tensioned to such an extent that, in this height positioning, the second torque D2, resulting from the pre-tensioning, and the first torque D1, corresponding to the minimum length of the weight-receiving lever arm, substantially compensate each other.

When lowering the pedestal platform 10, the cable 236 is being unwound from the volute 232 in a direction from the right end of the volute 232 towards the left end thereof while following the curved line and thus, the length of the weight-receiving lever arm and, hence, also the absolute value of the first torque D1, increase as the height of the pedestal platform 10 decreases. At the same time, the rotation of the volute 232 associated with unwinding the cable 236 from the volute 232 leads to an increase of the torsion of the torsion spring 220 and, hence, to an increase of the absolute value of the second torque D2 acting on the volute 232. Thus, when lowering the platform 10, both the first torque D1 and the second torque D2 (which counteracts the first torque D1) increase, wherein the increase of the first torque D1 at least partially compensates for the increase of the second torque D2. The shape of the volute 232 and/or the shape of the curved line of the volute 232 may be adjusted such that the total torque acting on the volute 232 and, hence, also the force required for height-adjusting the pedestal platform 10 are substantially independent of the height position of the platform 10.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A height-adjustable pedestal comprising:
a guiding device having a substantially vertical orientation, said guiding device includes a vertical guide rail,
a height-adjustable foot platform having
at least one slide carriage movable vertically along the guiding device, and
a support member having
a rear side,
a front side spaced from the rear side, and
a flat plate extending between the rear side and the front side, and the flat plate having a free end opposite the rear side,
the support member mounted along the rear side to the slide carriage where the support member is on a side of the slide carriage different from the guiding device and the support member extending away from the slide carriage in the direction of the front side,
a spring device that provides a spring force according to a corresponding spring characteristic, the spring device including a helical spring orientated vertically parallel and adjacent to a side of said vertical guide rail, and
a lever mechanism that is interconnected between the spring device and the platform such that the spring force is transferred by the lever mechanism to the platform in a manner so as to provide a lifting force that counteracts the weight force of the platform in order to facilitate the height-adjustment of the platform where the lifting force is greater than the weight force by a substantially constant amount, wherein the lever mechanism is configured such that it at least partially compensates for a variation of the spring force that occurs according to the spring characteristic;

a vertical retaining plate connected to the guiding device such that the vertical retaining plate is between the guiding device and the spring device;

a second spring device; and a second lever mechanism, and wherein the guiding device includes a second vertical guide rail, each rail having a guiding channel in sliding engagement of the at least one slide carriage, the lever mechanism and the second lever mechanism each includes a rotation shaft, a cam disc defining a leverage ratio between the spring force and the weight force, the cam disc is connected to the rotation shaft, and a cable that is guided around the cam disc such that the spring force is transferred to the platform by the cable, and each of the spring device and the second spring device is parallel to the rails and vertically extend around and along a substantial length of one of the rotation shafts.

2. The pedestal according to claim 1, wherein the cam disc is a cone-shaped body with a curved line formed thereon, wherein the curved line extends along the cone-shaped body in a helically wound spiral manner.

3. The pedestal according to claim 2, wherein the spring device and the second spring device each includes a mechanical spring.

4. The pedestal according to claim 3, wherein each mechanical spring is a torsion spring.

5. The pedestal according to claim 3, wherein each mechanical spring is arranged coaxially with the respective rotation shaft.

6. The pedestal according to claim 5, wherein each mechanical spring is a torsion spring.

7. The pedestal according to claim 6, wherein each torsion spring has one end non-rotatably coupled to the cam disc so as to co-rotate with the cam disc.

8. The pedestal according to claim 3, wherein each mechanical spring is a coil spring, which is arranged with its longitudinal direction being aligned vertically.

9. The pedestal according to claim 1, wherein the spring device and the second spring device each includes a mechanical spring.

10. The pedestal according to claim 9, wherein each mechanical spring is a torsion spring.

11. The pedestal according to claim 9, wherein each mechanical spring is a coil spring, which is arranged with its longitudinal direction being aligned vertically.

12. The pedestal according to claim 1, wherein the spring device and the lever mechanism are arranged to be stationary.

13. The pedestal according to claim 1, wherein each of the two spring devices includes a coil spring.

14. The pedestal according to claim 1, wherein each spring device extends along a substantial length of the respective rotation shaft.

15. The pedestal according to claim 14, wherein for each spring device, one end is attached to the rotational shaft and the other end is attached to a stationary base.

16. The pedestal according to claim 15, wherein each cam disc is connected proximate to an end of one of the rotation shafts.

17. The pedestal according to claim 1, wherein the guiding device includes at least one second vertical guide rail, and the spring device includes at least two one second helical spring where each helical spring is vertically orientated parallel and adjacent to one of the guide rails.

18. The pedestal according to claim 17, wherein the vertical guide rails are orientated to face each other such that the slide carriage slides between the guide rails.

19. The pedestal according to claim 1, wherein
the spring device includes at least one second helical spring.

20. The pedestal according to claim 19, wherein one end of each helical spring is attached to one of the rotational shafts and the other end is attached to a stationary base.

21. The pedestal according to claim 20, wherein
each cam disc is connected proximate to an end of one of the rotation shafts.

22. The pedestal according to claim 1, wherein the rear side is a rear wall and the front side is a front wall.

23. The pedestal according to claim 22, wherein the rear wall is larger than the front wall.

24. The pedestal according to claim 23, wherein the support member further includes lateral side walls connected to the rear wall, the front wall, and the flat plate.

25. The pedestal according to claim 1, wherein the support member includes two lateral sides opposite to each other extending between the front side and the rear side.

26. A height-adjustable foot pedestal for use in a vehicle by a driver, said pedestal comprising:

a guiding device having a substantially vertical orientation, said guiding device includes a vertical guide rail;

a platform having
a flat plate having a rear side, a front side spaced from said guiding device by two lateral sides, said flat plate is inclined relative to a horizontal plane, and
a slide carriage connected between the rear side of said flat plate and said guiding device such that said flat plate cantilevers from said slide carriage, and said slide carriage is movable vertically along said guiding device;

a spring having a first end and a second end wherein said second end is anchored, said spring provides a spring force having a spring characteristic, said spring including a helical spring orientated vertically parallel and adjacent to a side of said vertical guide rail;

a lever mechanism interconnected between said first end of said spring and said platform to transfer the spring force from said spring to said platform to provide a lifting force that counteracts a weight force of said platform to facilitate the height-adjustment of said platform, said lever mechanism is configured such that it at least partially compensates for a variation of the spring force occurring according to the spring characteristic;

a vertical retaining plate connected to said guiding device such that said vertical retaining plate is between said guiding device and said spring;

a second spring; and a second lever mechanism, and wherein said guiding device includes a second vertical guide rail, each rail having a guiding channel in sliding engagement of said slide carriage, said lever mechanism and said second lever mechanism each includes
a rotation shaft, and
a volute defining a leverage ratio between the spring force and the weight force, said volute is connected to said rotation shaft and each of said spring and said second spring is parallel to said rails and vertically extend around and along a substantial length of one of said rotation shafts.

27. The pedestal according to claim 26, further comprising a base member on which said springs are anchored, and wherein each rotation shaft around which one respective spring vertically extends upward from said base member along a substantial length of said rotation shaft.

28. The pedestal according to claim 27, wherein each of said volutes includes a cone-shaped body with a curved line formed thereon, wherein the curved line extends along the cone-shaped body in a helically wound spiral manner and said respective rotation shaft extends beyond said cone-shaped body.

29. The pedestal according to claim 26, wherein said slide carriage and said platform have substantially the same width.

30. The pedestal according to claim 26, further comprising two pulleys; and wherein said lever mechanism and said second lever mechanism each includes a cable passing over one of said pulleys, said cable attached to at least one of said slide carriage and said platform, and each of said pulleys is on an opposite side of said vertical retaining plate from said spring and said second spring.

\* \* \* \* \*